US008574355B2

(12) United States Patent
Jang et al.

(10) Patent No.: US 8,574,355 B2
(45) Date of Patent: Nov. 5, 2013

(54) SYSTEM FOR CHECKING FILTER OF AIR CLEANER FOR AUTOMOBILES

(75) Inventors: Younghak Jang, Seoul (KR); Woomin Jung, Hwaseong-si (KR); Minyong Park, Suwon-si (KR); Changho Lee, Suwon-si (KR)

(73) Assignees: Hyundai Motor Company, Seoul (KR); Daeki Corporation, Suwon-Si (KR)

( * ) Notice: Subject to any disclaimer, the term of this patent is extended or adjusted under 35 U.S.C. 154(b) by 82 days.

(21) Appl. No.: 13/298,054

(22) Filed: Nov. 16, 2011

(65) Prior Publication Data

US 2012/0137891 A1 Jun. 7, 2012

(30) Foreign Application Priority Data

Dec. 6, 2010 (KR) ........................ 10-2010-0123885

(51) Int. Cl.
*B01D 46/46* (2006.01)

(52) U.S. Cl.
USPC ........................ 96/421; 96/424; 95/19; 95/26

(58) Field of Classification Search
USPC ................. 55/DIG. 34, 467; 95/8, 25, 15, 19; 96/113, 114, 161, 417, 421, 422, 18, 96/26, 109, 111, 117; 702/47
See application file for complete search history.

(56) References Cited

U.S. PATENT DOCUMENTS

| | | | | |
|---|---|---|---|---|
| 5,711,785 | A * | 1/1998 | Maxwell | 95/15 |
| 5,810,908 | A * | 9/1998 | Gray et al. | 95/25 |
| 7,686,872 | B2 * | 3/2010 | Kang | 96/417 |
| 7,749,303 | B2 * | 7/2010 | Wright | 95/8 |
| 7,758,676 | B2 * | 7/2010 | Mital et al. | 96/113 |
| 7,875,100 | B2 * | 1/2011 | Wright | 95/8 |
| 8,083,841 | B2 * | 12/2011 | Cheng | 96/417 |

FOREIGN PATENT DOCUMENTS

| | | | |
|---|---|---|---|
| KR | 10-0188594 | B1 | 1/1999 |
| KR | 10-0217926 | B1 | 6/1999 |
| KR | 1999-0041857 | A | 6/1999 |

* cited by examiner

*Primary Examiner* — Duane Smith
*Assistant Examiner* — Minh-Chau Pham
(74) *Attorney, Agent, or Firm* — Morgan, Lewis & Bockius LLP

(57) ABSTRACT

A system recognizes a check-up time of a filter of an air cleaner. The system includes a power unit that supplies power to the system, a pressure sensor that measure pressure of a filter, at an outlet connected with a filter unit, a conversion circuit that converts the measured value into a predetermined type, a processor that controls the measurement period of the pressure sensor and receives and compare the measured value converted by the conversion circuit with a predetermined reference value, and a display unit that displays a filter replacement period.

7 Claims, 3 Drawing Sheets

SYSTEM FOR CHECKING FILTER OF AIR CLEANER FOR AUTOMOBILES

CROSS-REFERENCE TO RELATED APPLICATIONS

The present application claims priority to Korean Patent Application Number 10-2010-0123885 filed Dec. 6, 2010, the entire contents of which application is incorporated herein for all purposes by this reference.

BACKGROUND OF INVENTION

1. Field of Invention

The present invention relates to an air cleaner that removes foreign substances in the air when drawn into the engine of a vehicle, and more particularly, to a system for recognizing check-up time of a filter included in an air cleaner.

2. Description of Related Art

In general, air cleaners are composed of an air filter, an air cleaner box or an air cleaner body, and an air cleaner cover and prevent dust in intake air (including hard substances, such as silica and alumina) from flowing into an engine and accelerating wear.

The filter should be periodically cleaned or replaced with a new filter, but drivers who cannot accurately know appropriate replacement time replace the filter in proportion to the traveling distance or replace a filter, which is not required to be replaced, with a new filter, thereby causing unnecessary economic burden.

In the related art, the drivers had to determine the replacement time from a manual, without a filter replacement recognition system, and replace the filter. Further, even if there is a filter replacement recognition system, the drivers had to directly check the air cleaner equipped with a mechanical valve in the engine room.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a system for recognizing check-up time of a filter of an air cleaner which allows a driver to easily check filter replacement time from a cluster displaying the driving status.

The present invention has been made in an effort to provide a system for recognizing check-up time of a filter of an air cleaner, the system including a power unit that supplies power to the system, a pressure sensor that measure pressure of a filter, at an outlet connected with a filter unit, a conversion circuit that converts the measured value into a predetermined type, a processor that controls the measurement period of the pressure sensor and receives and compare the measured value converted by the conversion circuit with a predetermined reference value, and a display unit that displays a filter replacement period.

The pressure sensor may be a piezoelectric element.

The display unit may be an LED lamp.

The display unit may be turned on/off in accordance with the compared result by the processor.

The system may be automatically reset, when the filter of the air cleaner is replaced.

The reference value may be set by program or a DIP switch.

According to various aspects of the present invention, it is possible to allow a driver to accurately and easily recognize replacement time of a filter by turning on a warning lamp on the dashboard of a vehicle, when driving a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
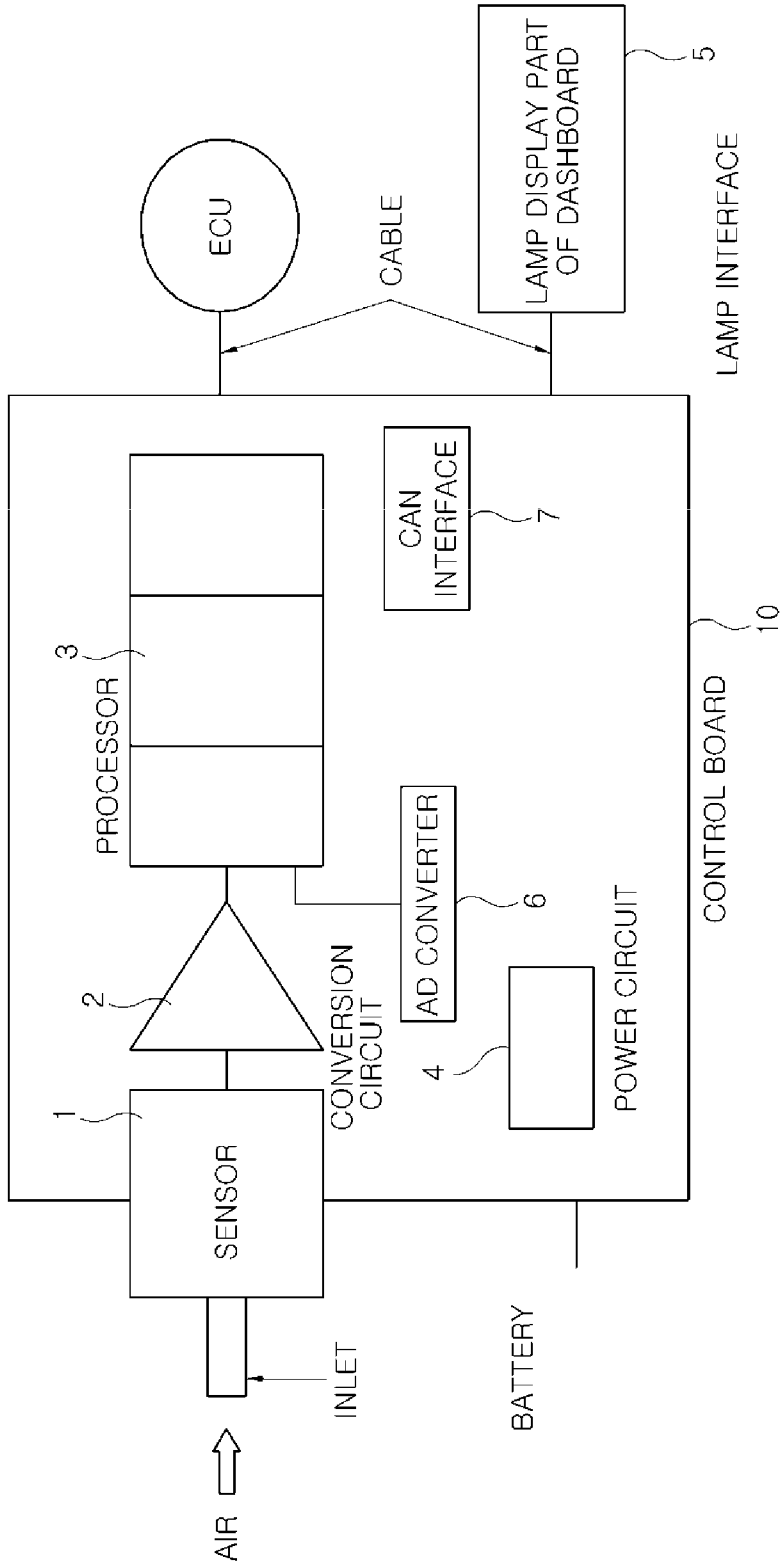
FIG. 1 is a view showing an exemplary system for recognizing check-up time of a filter of an air cleaner according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In the present invention, a check-up time or a service/maintenance reminder of an air cleaner filter is recognized or determined by sensing pressure with an electronic sensor. The electronic sensor may be a piezoelectric type.

The operation uses a principle that pressure increases when impurities, such as dust, accumulate on the air filter. When pressure above a predetermined level is continuously sensed while a vehicle travels, a warning light on the dash board of the vehicle is turned on. It can be implemented by own ECU program, without communicating with a main ECU, and can also be implemented without a reset switch.

Air pressure is transmitted to the electronic pressure sensor by farming a specific exhaust structure behind the filter in the air filter unit. Next, the pressure sensor measures analog type voltage or a pressure value is measure in a digital type through a specific conversion circuit.

A microprocessor checks pressure in a predetermined period.

When pressure above a predetermined level continues for a predetermined time, the warning light of the dash board is turned on. In this case, it is possible to consider a rapid acceleration time of the driver. The warning light is automatically turned off, after the air filter unit is replaced.

The principle of sensing pressure using an electronic sensor is described. The degree of pressure is measured from a change in the amount of electricity which is generated when pressure is applied to a piezoelectric element, by using a piezoresistive effect that generates electromotive force when pressure is applied.

A semiconductor type of pressure sensor applied to the present invention generates a change in resistance according to a change in pressure by using a piezoelectric sensor, includes an amplifying circuit to have an appropriate amount of change inside or outside, and may include a temperature compensating circuit for accurate measurement.

In the present invention, it is possible to change a set value (operational pressure) with program or a DIP switch, without changing the circuit in accordance with the type of vehicle, after manufacturing a basic control board. It is possible to improve the entire productivity of a vehicle by changing the reference value.

Further, it is possible to prevent malfunction and function considering battery current consumption by making an appropriate measurement period or a sampling period variable.

According to a function of automatically checking the traveling status of a vehicle by using a pressure difference of the present invention, it is possible to implement a stand-along function without communicating with the ECU. Further, it is possible to improve reliability by minimizing breakdown with a simple structure.

A switch for reset after filter replacement and malfunction is not required, because of the reset function operated by automatic sensing.

Further, a communication port for outputting real-time pressure status is provided and an LED may be used as an output display means.

Hereinafter, a system for recognizing check-up time of a filter of an air cleaner of the present invention is described with reference to FIG. 1.

A recognizing system of the present invention may be composed of a control board 10 including a sensor 1, a conversion circuit 2, an AD converter 6, a processor 3, and a power circuit 4, and a lamp interface 5.

Sensor 1 may be an electronic or a piezoelectric pressure sensor and generates electromotive force corresponding to exposed pressure. The electromotive force is converted into voltage in an analog type and a pressure value is directly converted into a value in a digital type. It is possible to change a reference value of pressure sensing, when using the electronic sensor. Although it is difficult to variously set the reference value by using mechanical on/off switch concept in the related art, it is possible to variously change and set the reference value in accordance with the external circumstances. That is, it is possible to variously change the reference value for the range from 0 to a specific maximum value by using program, without changing the circuit. For example, the sensing range may be 0 to 300 mm $H_2O$.

Control board 10 may be a circuit board implementing conversion circuit 2, processor 3, power circuit 4, lamp interface 5.

Conversion circuit 2 may be a stabilizing circuit for appropriately applying resistance changed by the sensor to the AD converter input or a filter circuit for removing noises.

Processor 3 is a microcontroller for implementing the entire function and used to control a sensor interface, status determination, and turning on/off the lamp. In the present invention, it is possible to implement a low-power driving mode, because an energy saving processor is used. A processor self-standby mode is possible under 20 μA/5V and the operation is possible under 200 μA/5V, but voltage loss is generated when it is changed from 12VDC to 5VDC and the design should be made in consideration of the power consumed by the sensor unit and the LED.

Power circuit 4 is a circuit for receiving power from a battery in the vehicle and changing the power into voltage suitable to be supplied to the entire circuit.

AD converter 6 may be a circuit part for changing the resistance change generated by the sensor into voltage, and a peripheral circuit thereof. A built-in processor type or a specific independent type is possible. The AD converter is not required, when the sensor is a digital type.

A CAN interface 7 is a Controller Area Network interface. In the related art, the automobile manufacturers connect electronic devices in vehicles, using a point-to-point wiring system, but a large number of electronic devices are equipped in the vehicles, with the lapse of time, such that problems, such as a large space, heavy weight, and large cost, have appeared in the wiring device. Therefore, it was possible to reduce the wiring cost, complicity, and weight by using exclusive wiring. The CAN, a high-integrity serial bus system for constructing an intellectual device network, is used as a standard for a vehicle network. An economical and stable network allowing several CAN device to communicate with each other is provided by using the CAN interface. An advantage of the network is that the ECU not have analog and digital input for each device in the system, but has only to have a single CAN interface. Therefore, it is possible to reduce the entire cost and weight of the vehicle. If necessary, it may be implemented as a circuit part communicating with the main ECU of the vehicle, a peripheral circuit process built-in type, or a single part.

Lamp interface 5 may be disposed on the dashboard of the vehicle to inform the use status of the air filter, and for example, may be composed of an LED or a common lamp and a peripheral circuit.

Figure 2:
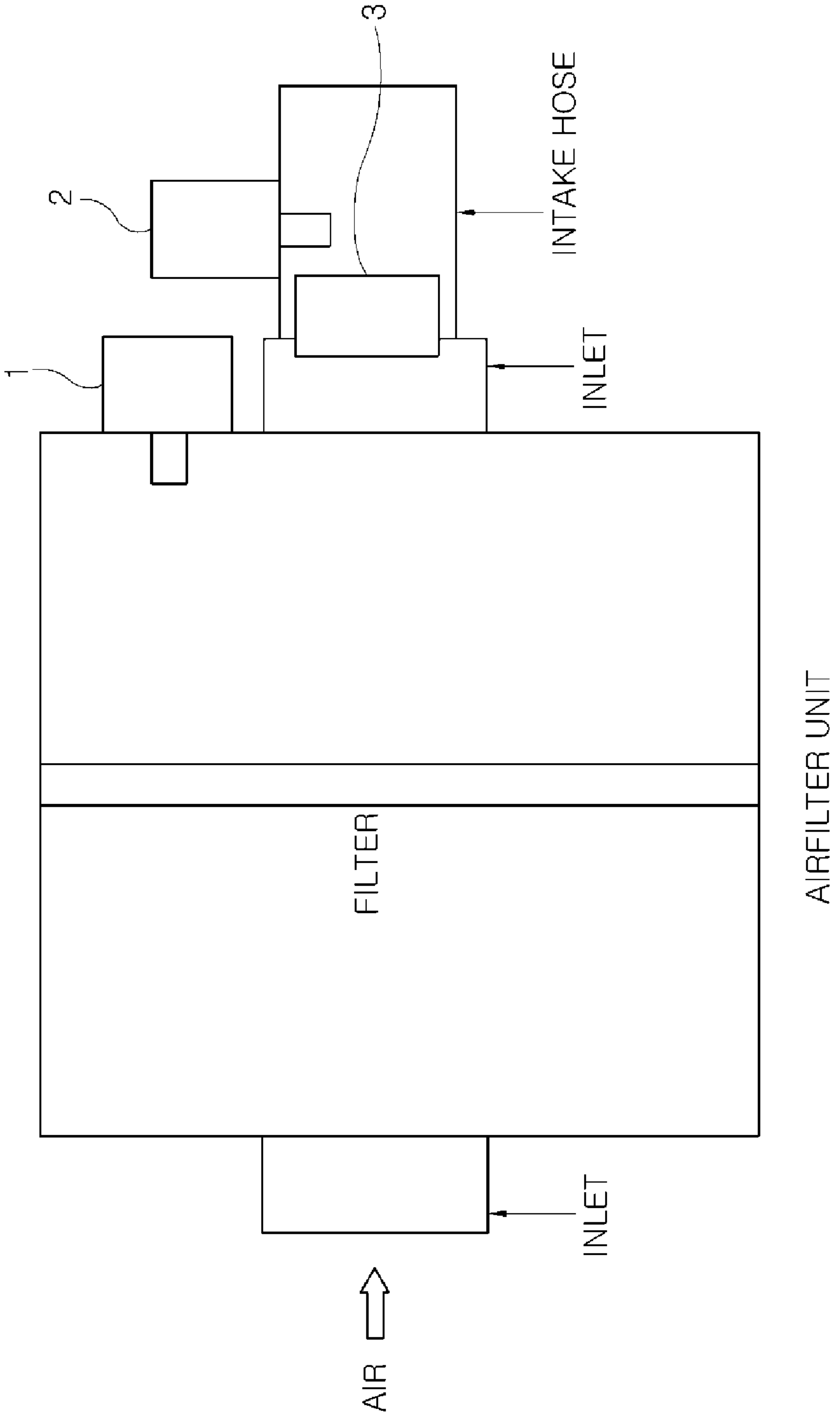
FIG. 2 is a view showing an exemplary air filter unit where the system for recognizing check-up time of a filter of an air cleaner according to the present invention is installed.

The configuration of the air filter unit and the recognition system is described with reference to FIG. 2. In the recognition system according to various embodiments of the present invention, the air filter system can be attached to an outlet 1 and an intake hose 2 through a filter. Further, it may be implemented as a specific device 3 between the outlet and the intake hose.

Figure 3:
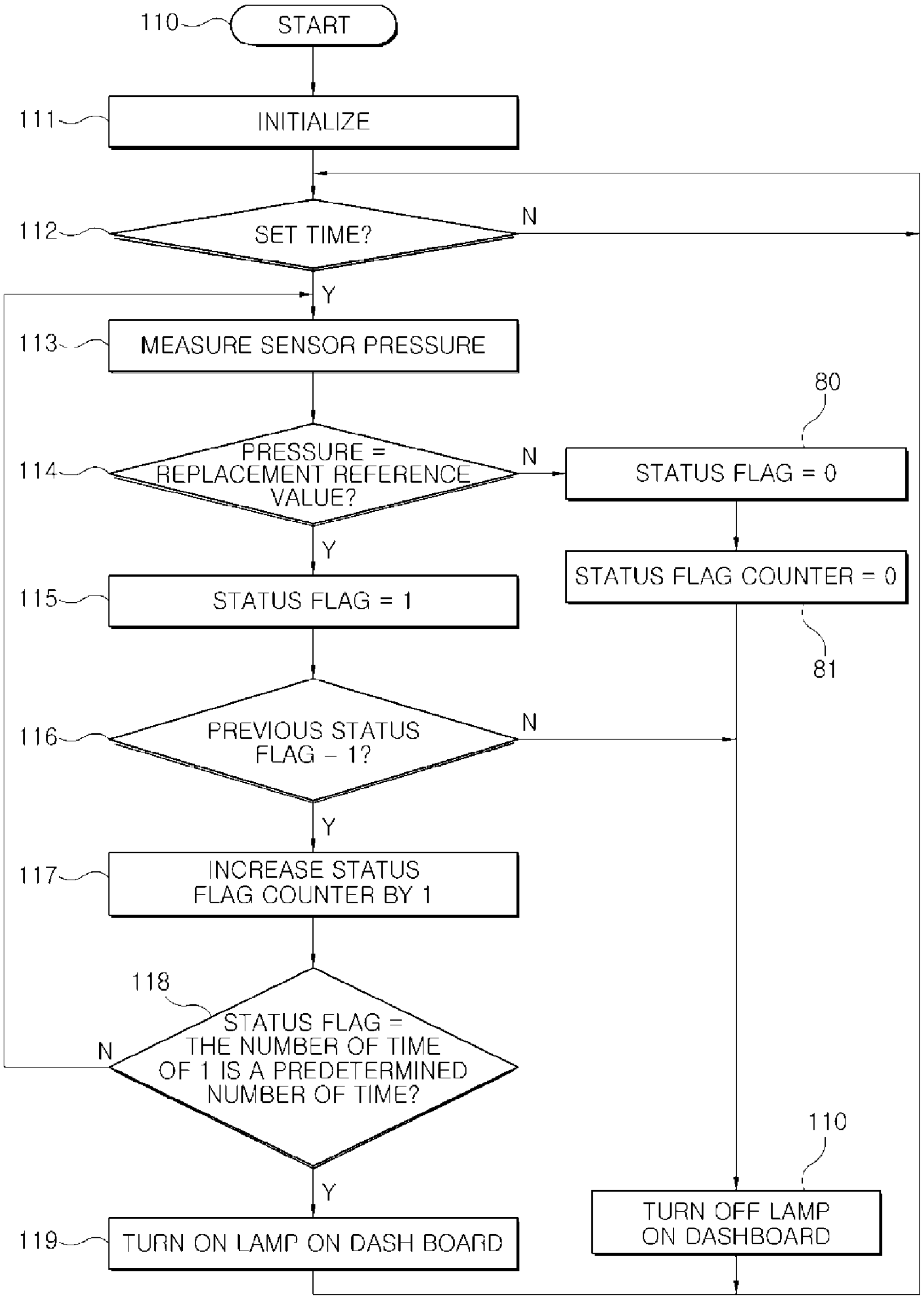
FIG. 3 is a view showing the operation of recognizing check-up time of an exemplary system for recognizing check-up time of a filter of an air cleaner according to the present invention.

Hereinafter, the operation of the recognition system of the present invention is described with reference to FIG. 3. First, the initial system is reset (111). For example, since the reset after the filter is replaced can be implemented by automatic sensing, the reset switch of the related art is not required.

Sampling is performed at each predetermined time to minimize power loss of the battery of the vehicle (112). The sampling period can be variably set. For example, it may be set in the range of 1 to 180 seconds. The sampling period may be changed in consideration of power current consumption. Next, pressure applied to the filter is measured (113). When the pressure does not reach a predetermined reference replacement level, a status flag is set to 0 (80) and a status flag counter is also set to 0 (81). When the status flag counter is 0, the lamp of the dashboard is turned off (110).

When the measured pressure is above the reference replacement level, the status flag is set to 1 (115). When the previous status flag was 1, the status flag counter increases by 1 (117). Status information is stored in a memory. Measurement is performed for a predetermined number of times in order to prevent malfunction due to temporal increase of pressure due to rapid acceleration. Thereafter, the number of time when the status flag is 1 is compared with a predetermined specific number of times (118). When the number of time when the status flag is 1 becomes the predetermined specific number of time, the lamp on the dashboard is turned on (119).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for determining a check-up time of an air filter of an air cleaner, the system comprising:

a filter unit including an air filter;

a power unit supplying power;

a pressure sensor measuring pressure of air passing through the air filter, the pressure sensor being disposed at an outlet connected of the filter unit;

a conversion circuit that converts a measured pressure value into a measured pressure signal;

a processor that controls a measurement period of the pressure sensor and receives and compares the measured pressure signal converted by the conversion circuit with a predetermined reference value; and a display unit that displays a filter replacement period based on a result of the comparison in the processor;

wherein a measurement of the pressure is performed for a predetermined number of times and the processor counts the number of measured pressure signals that are above the predetermined reference value; and wherein the display unit is turned on when the counted number of the measured pressure signals that are above the predetermined reference value reaches a predetermined specific number of times.

2. The system as defined in claim 1, wherein the pressure sensor is a piezoelectric element.

3. The system as defined in claim 1, wherein the display unit is an LED lamp.

4. The system as defined in claim 3, wherein the display unit is turned on/off in accordance with a compared result by the processor based on the measured pressure signal and the predetermined reference value.

5. The system as defined in claim 1, wherein the system is automatically reset when the filter of the air cleaner is replaced.

6. The system as defined in claim 1, wherein the reference value is set by a program.

7. The system as defined in claim 1, wherein the reference value is set by a DIP switch.

* * * * *